United States Patent
Ashish

(10) Patent No.: US 8,045,655 B2
(45) Date of Patent: Oct. 25, 2011

(54) APPARATUS AND METHOD FOR SIGNAL DETECTION IN A COGNITIVE RADIO-BASED WIRELESS COMMUNICATION SYSTEM

(75) Inventor: Pandharipande Ashish, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1211 days.

(21) Appl. No.: 11/592,403

(22) Filed: Nov. 3, 2006

(65) Prior Publication Data

US 2007/0100922 A1 May 3, 2007

Related U.S. Application Data

(60) Provisional application No. 60/733,304, filed on Nov. 3, 2005, provisional application No. 60/733,858, filed on Nov. 4, 2005.

(30) Foreign Application Priority Data

Jun. 2, 2006 (KR) .......................... 10-2006-0050082

(51) Int. Cl.
*H03D 1/00* (2006.01)
*H04L 27/06* (2006.01)
(52) U.S. Cl. .................. 375/343; 375/260; 375/340
(58) Field of Classification Search .......... 375/259–260, 375/295–296, 316–317, 340, 343, 346–347
See application file for complete search history.

(56) References Cited

U.S. PATENT DOCUMENTS

| | | | |
|---|---|---|---|
| 5,260,968 A * | 11/1993 | Gardner et al. ............... | 375/347 |
| 5,323,337 A | 6/1994 | Wilson et al. | |
| 5,361,258 A | 11/1994 | Arnold et al. | |
| 5,697,078 A | 12/1997 | Peterson et al. | |
| 6,385,434 B1 | 5/2002 | Chuprun et al. | |
| 6,459,704 B1 | 10/2002 | Jandrell | |
| 6,483,829 B1 | 11/2002 | Yamamoto | |
| 6,714,605 B2 | 3/2004 | Sugar et al. | |
| 2002/0176638 A1 * | 11/2002 | Stone et al. ................... | 382/294 |
| 2004/0092281 A1 * | 5/2004 | Burchfiel ....................... | 455/522 |
| 2004/0120424 A1 | 6/2004 | Roberts | |
| 2004/0170228 A1 * | 9/2004 | Vadde .......................... | 375/260 |
| 2005/0152313 A1 | 7/2005 | Cave et al. | |
| 2005/0186933 A1 * | 8/2005 | Trans ............................ | 455/296 |
| 2009/0003418 A1 * | 1/2009 | Karabinis ..................... | 375/219 |

OTHER PUBLICATIONS

W.A. Gardner, "Exploitations of spectral redundancy in cyclostationary signals," IEEE Signal Processing Magazine, vol. 8, No. 2, pp. 14-36, Apr. 1991.*

P. Nikolich and C.R. Stevenson, "Facilitating Opportunities for Flexible, Efficient, and Reliable Spectrum Use Employing Cognitive Radio Technologies" Federal Communication Commission. Washington, D.C. 20554. May 3, 2004.*

* cited by examiner

*Primary Examiner* — Dac Ha
*Assistant Examiner* — James M Perez
(74) *Attorney, Agent, or Firm* — NSIP Law

(57) ABSTRACT

An apparatus and method for signal detection in a CR-based wireless communication system are provided. In the signal detection apparatus, a cyclic power calculator calculates the power spectral density of a cyclo-stationary and periodical signal to be detected with respect to a cyclic frequency and calculates optimum statistics using the power spectral density. A signal detector determines whether a signal exists or not according to the optimum statistics.

21 Claims, 2 Drawing Sheets

APPARATUS AND METHOD FOR SIGNAL DETECTION IN A COGNITIVE RADIO-BASED WIRELESS COMMUNICATION SYSTEM

PRIORITY

This application claims priority under 35 U.S.C. §119 to applications entitled "Apparatus and Method for Signal Detection in a Cognitive Radio-based Wireless Communication System" filed in the U.S. Patent and Trademark Office on Nov. 3, 2005 and assigned Ser. No. 60/733,304, filed on Nov. 4, 2005 and assigned Ser. No. 60/733,858, and an application filed in the Korean Intellectual Property Office on Jun. 2, 2006 and assigned Ser. No. 50082-2006 the contents of each of which are incorporated herein by reference.

BACKGROUND OF THE INVENTION

1. Field of the Invention

The present invention relates generally to a Cognitive Radio (CR)-based wireless communication system, and in particular, to an apparatus and method for detecting a Television (TV) signal on a radio channel.

2. Description of the Related Art

Along with the rapid development of wireless communication systems and a variety of wireless communication services, strict frequency separation is required for communication systems to coexist. Yet, there is only a limited spectrum available due to multiple applications over all of frequencies which can be commercially used. Hence, deployment of a new wireless platform faces a serious shortage of spectrum resources, particularly in lower frequency bands than a few gigahertz. To solve this spectrum shortage, the concept of CR has been introduced, which is a technique for detecting allocated but unused spectrum and efficiently sharing the unused spectrum.

Many countries have strictly regulated the use of frequency resources subject to their frequency policies, and service providers use frequencies through licensing and allocation from their governments. The CR technology enables the use of allocated but unused frequency resources.

In order to meet the recent increasing demand for the limited frequency resources, there is a pressing need for the CR technology, which has attracted much interest since the US Federal Communications Commission (FCC) commented on the possibility of frequency sharing in a Notice of Proposed Rule Making (NPRM) in December, 2003. Such a major example is a standardization of the Institute of Electrical and Electronics Engineers (IEEE) 802.22 Wireless Regional Area Network (WRAN) seeking the development of a CR-based communication platform. The IEEE 802.22 WRAN system is expected to be deployed in suburban areas of the U.S. or Canada, or in developing countries, aiming to provide wireless communication services using the CR technology in an unused TV frequency band.

CR standardization and development is active but in an early stage. Hence, there exist many issues to be handled and most of the configurations for the CR technology are yet to be specified.

CR, a technology for radio channel management, distribution, and interference detection using multiple channels, has a potential for interworking with future-generation wireless communications in a complementary fashion. For example, the CR technology can enable effective high-speed data transmission without frequency interference in shadowing areas existing under a cellular environment or in suburban areas requiring an increased cell size.

However, there are challenging issues to tackle in the application of CR to actual wireless communication systems. A major example is to detect a TV signal (hereinafter, simply referred to as a signal) to search for an unused channel.

In conventional signal detection, the power of a frequency band is measured. After the power measuring, the power measurement is compared with a predetermined threshold. For example, if the power measurement is equal to or less than the threshold, it is determined that no signal is detected. If the power measurement is greater than the threshold, it is determined that a signal exists in the frequency band and the signal is detected.

However, the conventional signal detection method cannot ensure reliability and suffers performance degradation.

SUMMARY OF THE INVENTION

An aspect of the present invention is to substantially solve at least the above problems and/or disadvantages and to provide at least the advantages below. Accordingly, the present invention provides an apparatus and method for detecting a TV signal in a CR-based wireless communication system.

The present invention provides an apparatus and method for detecting a TV signal according to the statistical signal characteristic of the signal.

The present invention provides an apparatus and method for detecting a TV signal in a cyclo-stationary approach.

The present invention provides an apparatus and method for detecting a TV signal with reliability in a CR-based wireless communication system.

The present invention provides an apparatus and method for detecting a TV signal such that performance degradation is prevented in a CR-based wireless communication system.

According to one aspect of the present invention, in a signal detection apparatus in a CR-based wireless communication system, a cyclic power calculator calculates the power spectral density of a cyclo-stationary and periodic signal, and calculates optimum statistics using the power spectral density. A signal detector determines whether a signal is detected or not based on the optimum statistics.

According to another aspect of the present invention, in a signal detection apparatus in a CR-based wireless communication system, if an input signal is discrete, a DFT processor performs a DFT on the input signal. A correlator calculates the power spectral density of a signal by correlating DFT signals received from the DFT processor. A calculator calculates optimum statistics using the power spectral density.

According to a further aspect of the present invention, in a signal detection method in a CR-based wireless communication system, the power spectral density of a cyclo-stationary and periodic signal is calculated and optimum statistics are calculated using the power spectral density. It is determined whether a signal is detected or not based on the optimum statistics.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
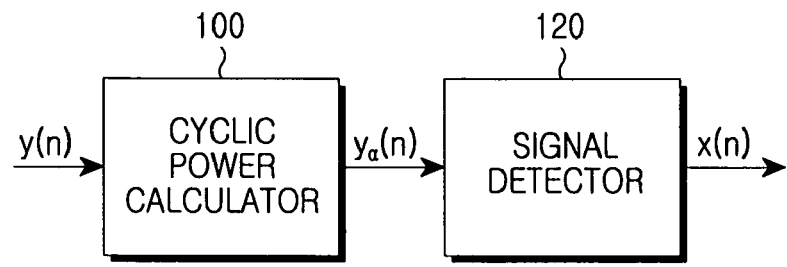
FIG. 1 is a block diagram of a signal detection apparatus in a CR-based wireless communication system according to the present invention.

Preferred embodiments of the present invention will be described herein below with reference to the accompanying drawings. In the following description, well-known functions or constructions are not described in detail since they would obscure the invention in unnecessary detail.

Before describing an apparatus and method for signal detection in a CR-based wireless communication system according to the present invention, a stationary process will be described.

The stationary process is a process in which the joint probability distribution of a random vector (X(t1), X(t2), ... X(tn)) is equal to that of a random vector (X(t1+s), X(t2+s), ... X(tn+s)), for all of N, s, t1, t2, ..., tn.

The probability of distribution of a random vector is dependent only on a period n, but constant in time.

As an example, if stock price follows the stationary process, the probability distribution of tomorrow's stock price calculated today is equal to that of the next day's stock price calculated on the same day a month later.

For detecting a signal x(t) sent on a channel h(t), a receiver detects a signal y(t) expressed as shown in Equation (1)

$$H_0: y(t)=n(t)$$

$$H_1: y(t)=h(t) \otimes x(t)+n(t) \quad (1)$$

where $H_0$ denotes a channel state with no signal. In the absence of any signal, the detected signal y(t) contains only noise n(t). The noise is an periodic signal, i.e. a random signal, like human-made noise.

$H_1$ denotes a channel state with a signal. In the presence of a signal, the detected signal y(t) is calculated by taking a convolution of the channel h(t) and the transmitted signal x(t) and summing the convolution and the noise n(t).

If the transmitted signal x(t) is Wide-Sense Stationary (WSS), the correlation is defined as Equation (2). WSS means that second-order statistics (i.e. the product of two signals) are cyclo-stationary.

$$R_x(\tau) = \varepsilon\left[x\left(t+\frac{\tau}{2}\right)x*\left(t-\frac{\tau}{2}\right)\right] \quad (2)$$

where $R_x(\tau)$ denotes the correlation, which is calculated by multiplying two signals at time points spaced by $\tau$ and averaging the product. Since x is a complex signal, a conjugate of x is taken. $\varepsilon$ represents the average.

$R_x(\tau)$ is not dependent on t. That is, since $R_x(\tau)$ has no relation to t, it is stationary. $R_x(\tau)$ is not a function of time itself but a function of time difference.

The power spectral density of the transmitted signal x(t) is achieved by Fourier transform of $R_x(\tau)$ expressed as shown in Equation (3)

$$S_x(f) = F[R_x(\tau)] = \int_{-\infty}^{\infty} R_x(\tau)e^{-j2\pi f\tau} d\tau \quad (3)$$

The reason for Fourier transform of $R_x(\tau)$ is to acquire a frequency-domain signal.

Using $S_x(f)$, optimum statistics $y_R(t)$ are derived by Equation (4)

$$y_R(t) = \int_{-\infty}^{\infty} \frac{|H(f)|^2}{N_0} S_x(f) * S_{yt}(t,f) df \quad (4)$$

The optimum statistics $y_R(t)$ are a basis for the decision. For example, if the power of a signal in a frequency band is equal to or greater than the sum of the optimum statistics and predetermined volts (V), it is determined that a signal exists in the frequency band. If the power measurement is less than the sum, it is determined that no signal exists in the frequency band.

In equation (4), $S_x(f)$ is the power spectral density of the original signal, that is, the transmitted signal, $S_{yt}(t,f)$ is the power spectral density of the current received signal y(t), and $N_0$ is noise power calculated by squaring the noise n(t) and averaging the square.

H(f) is a Fourier transform of h(t), given as shown in Equation (5)

$$H(f) = \int_{-\infty}^{\infty} h(t)e^{-j\omega t} dt \quad (5)$$

Now a description will be made of a cyclo-stationary signal detection method according to the present invention.

If a signal is cyclo-stationary, the correlation is defined as shown in Equation (6)

$$R_x\left(t+\frac{\tau}{2}, t-\frac{\tau}{2}\right) = \left[x\left(t+\frac{\tau}{2}\right)x*\left(t-\frac{\tau}{2}\right)\right] \quad (6)$$

$$= R\left(t+\frac{\tau}{2}+T_0, t-\frac{\tau}{2}+T_0\right)$$

$$= \sum_\alpha R_x^\alpha(\tau)e^{j2\pi\alpha t}$$

where the correlation function $R_x(t,\tau)$ is dependent on t. That is, $R_x(t,\tau)$ is a function of time related to t and is periodic. Due to the cyclo-stationary nature, the probability distribution of $R_x(t,\tau)$ is equal to that of $R_x(t,\tau+kT_0)$. k is an arbitrary integer.

The power spectral density $S_x^\alpha(f)$ of the transmitted signal with respect to a cyclic frequency is achieved by Fourier transform of $R_x^\alpha(\tau)$ expressed as shown in Equation (7)

$$S_x^\alpha(f) = F[R_x^\alpha(\tau)] = \int_{-\infty}^{\infty} R_x^\alpha(\tau)e^{-j2\pi f\tau} d\tau \quad (7)$$

where $\alpha$ denotes the cyclic frequency which can be expressed as $k/T_s$. $T_0$ is a multiple of $T_s$ and k is an integer.

In Equation (7), $S_x^\alpha(f)$ is the power spectral density of the transmitted signal x(t) when $\alpha=0$ and $S_x^0(f)=S_x(f)$.

The Fourier transform of $R_x^\alpha(\tau)$ is performed to achieve a frequency-domain signal.

Optimum statistics $y_\alpha(t)$ are derived by Equation (8)

$$y_\alpha(t) = \int_{-\infty}^{\infty} \frac{H^*\left(f+\frac{\alpha}{2}\right)H\left(f-\frac{\alpha}{2}\right)S_x^\alpha(f)^*}{S_n^0\left(f+\frac{\alpha}{2}\right)S_n^0\left(f-\frac{\alpha}{2}\right)} S_{yt}^\alpha(t,f) e^{j2\pi\alpha t} df \qquad (8)$$

The optimum statistics $y_\alpha(t)$ are a basis for the decision. In Equation (8), $S_x^\alpha(f)^* \, S_{yt}^\alpha(t,f)$ is the product between the power spectral density of the original signal, i.e. the signal to be detected, with respect to the cyclic frequency, and the power spectral density of the current received signal y(t) with respect to the cyclic frequency. The product is multiplied by the product between a channel value and a delay of the channel value by the cyclic frequency, divided by the product between the power spectrum densities of noise n(t) and its delay by the cyclic frequency, and subjected to inverse Fourier transform. As a consequence, the optimum statistics $y_\alpha(t)$ are achieved.

$S_n^0(f)$ is the power spectral density of noise n(t) at $\alpha=0$, and $S_{yt}^\alpha(t,f)$ is the power spectral density of the current received signal y(t). Also, $S_{yt}^\alpha(t,f)$ is the time-variant cyclic periodogram of y(t).

FIG. 1 is a block diagram of a signal detection apparatus in a CR-based wireless communication system according to the present invention. With reference to FIG. 1, signal detection in the CR-based wireless communication system will be described.

Referring to FIG. 1, the signal detection apparatus includes a cyclic power calculator 100 and a signal detector 120.

The cyclic power calculator 100 calculates the power spectral density of a cyclo-stationary and periodic signal to be detected with respect to a cyclic frequency, and calculates optimum statistics using the power spectral density.

The signal detector 120 compares the optimum statistics with a predetermined threshold. If the optimum statistics are greater than the threshold, the signal detector 120 detects a signal, determining the existence of the signal. If the optimum statistics are equal to or less than the threshold, the signal detector 120 determines that no signal exists.

Figure 2:
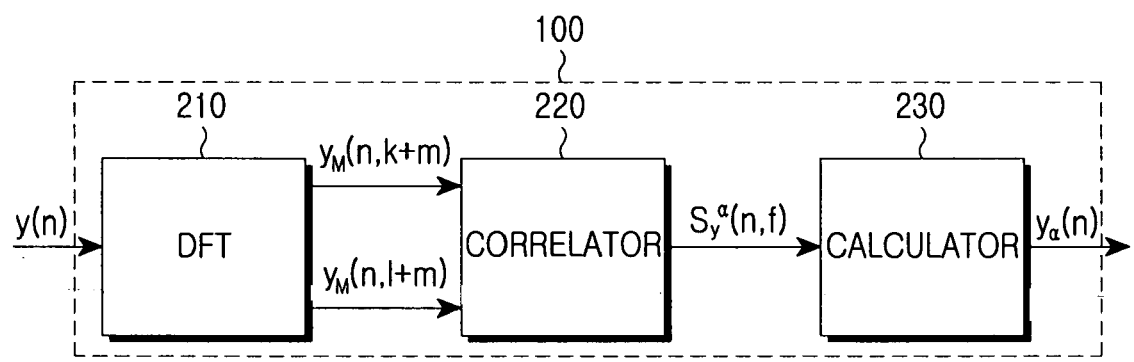
FIG. 2 is a block diagram of a cyclic power calculator of the signal detection apparatus in the CR-based wireless communication system according to the present invention.

FIG. 2 is a detailed block diagram of the cyclic power calculator 100.

Referring to FIG. 2, the cyclic power calculator 100 includes a Discrete Fourier Transform (DFT) process 210, a correlator 220, and a calculator 230.

If an input signal y(n) is discrete, the DFT processor 210 performs a DFT on the signal according to Equation (9)

$$Y_M(n,k) = \sum_{p=0}^{M-1} y(n-p) e^{-\frac{j2\pi k(n-p)}{M}} \qquad (9)$$

where $Y_M(n,k)$ denotes a DFT signal $Y_M$ at a $k^{th}$ frequency at time n output from the DFT processor 210.

$Y_M$ is provided in the form of $Y_M(n,k+m)$ and $Y_M(n,l+m)$ to the correlator 220. The correlator 220 correlates $Y_M(n,k+m)$ with $Y_M(n,l+m)$ by Equation (10)

$$S_y^\alpha(n,f) = \sum_{m=-P/2}^{P/2} Y_M(n,k+m) Y_M^*(n,l+m) \qquad (10)$$

where m denotes a running variable indicating a period and P is a sufficiently large integer.

The cyclic frequency $\alpha$ and the typical frequency f are expressed as shown in Equation (11)

$$\alpha = \frac{k-1}{M}, f = \frac{k+1}{M} \qquad (11)$$

where k denotes a frequency, and M denotes a DFT size.

The calculator 230 calculates Equation (8) using $S_y^\alpha(n,f)$ received from the correlator 220 and outputs the optimum statistics $Y_\alpha(t)$.

The signal detector 120 detects a signal using the optimum statistics $y_\alpha(t)$ and a threshold.

Figure 3:
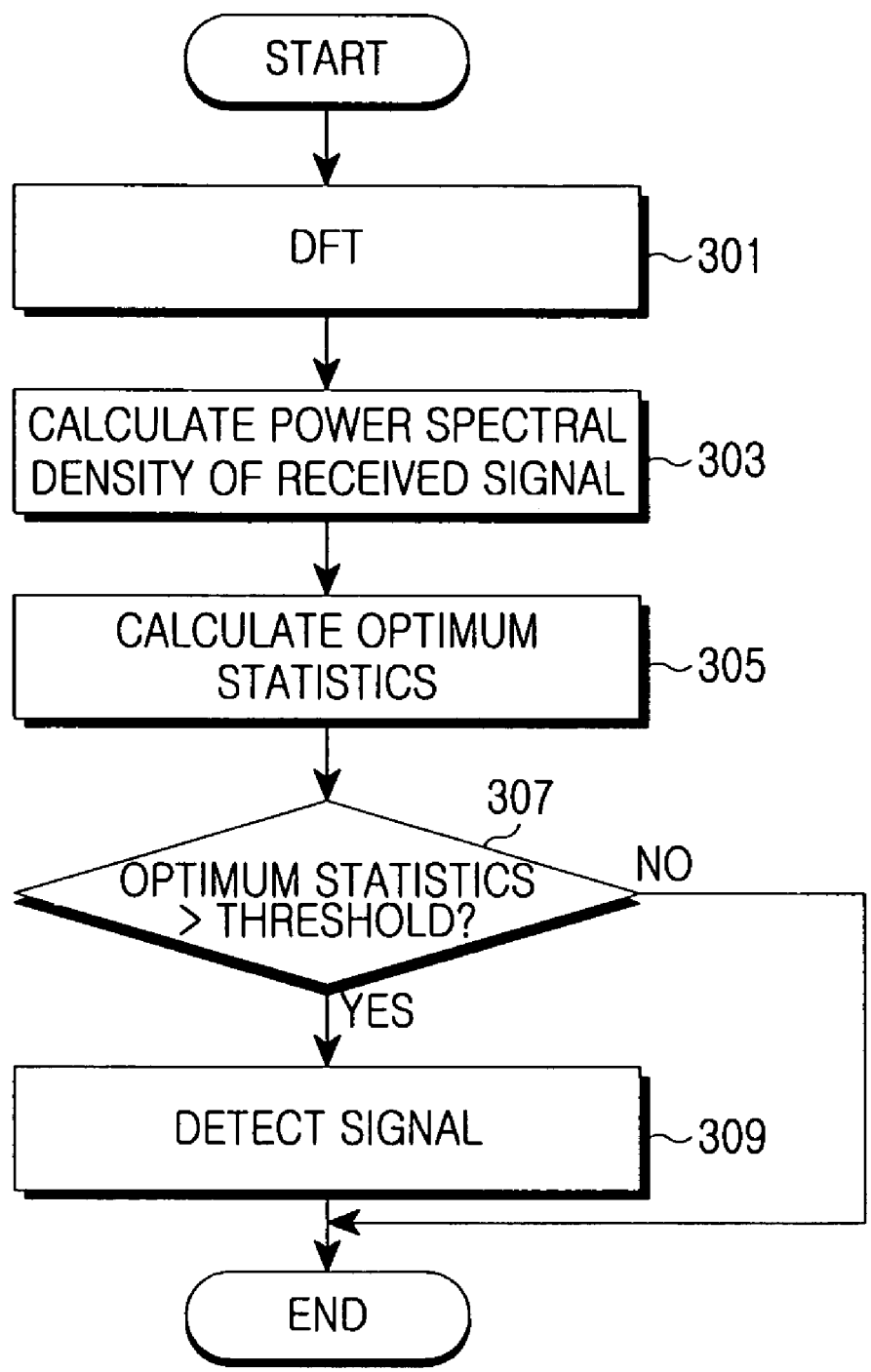
FIG. 3 is a flowchart illustrating a signal detection operation in the CR-based wireless communication system according to the present invention.

FIG. 3 is a flowchart illustrating a signal detection operation in the CR-based wireless communication system according to the present invention.

Referring to FIG. 3, the DFT processor 210 performs a DFT by Equation (9) if an input signal is discrete in step 301.

The DFT signal $Y_M$ is provided in the form of $Y_M(n,k+m)$ and $Y_M(n,l+m)$ to the correlator 220. The correlator 220 correlates $Y_M(n,k+m)$ with $Y_M(n,l+m)$ by Equation (10) and outputs the correlation $S_y^\alpha(n,f)$ in step 303. $S_y^\alpha(n,f)$ is the spectral density of the received signal with respect to a cyclic frequency.

The calculator 230 calculates the optimum statistics $y_\alpha(t)$ using $S_y^\alpha(n,f)$ according to Equation (8) in step 305.

In step 307, the signal detector 120 compares the optimum statistics $y_\alpha(t)$ with the threshold. If $y_\alpha(t)$ is equal to or less than the threshold, the procedure ends. If $Y_\alpha(t)$ is greater than the threshold, the signal detector 120 determines the existence of a signal and detects the signal in step 309.

As described above, the present invention has the following effects:

(1) a communication signal can be detected in a CR-based wireless communication system;

(2) reliability is ensured in the signal detection process in the CR-based wireless communication system; and (3) performance degradation is prevented in the signal detection process in the CR-based wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A signal detection apparatus in a Cognitive Radio (CR)-based wireless communication system, comprising:
a cyclic power calculator for calculating a power spectral density of a cyclo-stationary and periodic signal, and calculating optimum statistics using the power spectral density; and
a signal detector for determining whether a signal to be detected is existent or not according to the optimum statistics;
wherein the calculated power spectral density includes a power spectral density of the signal to be detected and a power spectral density of a current received signal, and the optimum statistics are calculated using the power spectral density of the signal to be detected and the current received signal.

2. The signal detection apparatus of claim 1, wherein the cyclic power calculator comprises:
a Discrete Fourier Transform (DFT) processor for performing a DFT on the cyclo-stationary and periodic signal in response to the cyclo-stationary and periodic signal being discrete;
a correlator for calculating the power spectral density of the signal to be detected by correlating DFT signals received from the DFT processor; and
a calculator for calculating the optimum statistics using the power spectral density of the signal to be detected and the current received signal.

3. The signal detection apparatus of claim 2, wherein the DFT processor performs the DFT on the cyclo-stationary and periodic signal according to $$Y_M(n, k) = \sum_{p=0}^{M-1} y(n-p)e^{-\frac{j2\pi k(n-p)}{M}}$$

where n denotes a time and k denotes frequency.

4. The signal detection apparatus of claim 2, wherein the correlator correlates $Y_M(n,k+m)$ with $Y_M(n,l+m)$ by $$S_y^\alpha(n, f) = \sum_{m=-P/2}^{P/2} Y_M(n, k+m)Y_M^*(n, l+m)$$

where m denotes a running variable indicating a period, P is an integer, and $Y_M$ is a DFT signal received from the DFT processor.
where n denotes a time and k denotes frequency.

5. The signal detection apparatus of claim 1, wherein the cyclic power calculator calculates the power spectral density of the current received signal by $$S_y^\alpha(n, f) = \sum_{m=-P/2}^{P/2} Y_M(n, k+m)Y_M^*(n, l+m)$$

where m denotes a period, P is an integer, and $Y_m$ denotes a signal output from a Discrete Fourier Transform (DFT) processor.

6. The signal detection apparatus of claim 1, wherein the cyclic power calculator calculates the optimum statistics using the power spectral density by $$y_\alpha(t) = \int_{-\infty}^{\infty} \frac{H^*\left(f+\frac{\alpha}{2}\right)H\left(f-\frac{\alpha}{2}\right)S_x^\alpha(f)^*}{S_n^0\left(f+\frac{\alpha}{2}\right)S_n^0\left(f-\frac{\alpha}{2}\right)} S_{yt}^\alpha(t, f)e^{j2\pi\alpha t} df$$

where $S_x^\alpha(f)^*S_{yt}^\alpha(t,f)$ is the product between the power spectral density of the signal to be detected, and the power spectral density of the current received signal y(t), $S_n^0(f)$ is the power spectral density of noise n(t) at $\alpha=0$, and $S_{yt}^\alpha(t,f)$ is the power spectral density of the current received signal y(t).

7. A signal detection apparatus in a Cognitive Radio (CR)-based wireless communication system, comprising:
a Discrete Fourier Transform (DFT) processor for performing a DFT on an input signal in response to the input signal being discrete, the DFT processor outputting DFT signals;
a correlator for calculating a power spectral density of the input signal by correlating DFT signals received from the DFT processor; and
a calculator for calculating optimum statistics using the power spectral density;
wherein the calculated power spectral density includes a power spectral density of a signal to be detected and a power spectral density of a current received signal, and the optimum statistics are calculated using the power spectral density of the signal to be detected and the current received signal.

8. The signal detection apparatus of claim 7, further comprising a signal detector for determining whether the input signal is detected or not based on the optimum statistics.

9. The signal detection apparatus of claim 7, wherein the calculator calculates the optimum statistics using the power spectral density by $$y_\alpha(t) = \int_{-\infty}^{\infty} \frac{H^*\left(f+\frac{\alpha}{2}\right)H\left(f-\frac{\alpha}{2}\right)S_x^\alpha(f)^*}{S_n^0\left(f+\frac{\alpha}{2}\right)S_n^0\left(f-\frac{\alpha}{2}\right)} S_{yt}^\alpha(t, f)e^{j2\pi\alpha t} df$$

where $S_x^\alpha(f)^*S_{yt}^\alpha(t,f)$ is the product between the power spectral density of the signal to be detected, and the power spectral density of the current received signal y(t), $S_n^0(f)$ is the power spectral density of noise n(t) at $\alpha=0$, and $S_{yt}^\alpha(t,f)$ is the power spectral density of the current received signal y(t).

10. The signal detection apparatus of claim 7, wherein the DFT processor performs the DFT on the input signal according to $$Y_M(n, k) = \sum_{p=0}^{M-1} y(n-p)e^{-\frac{j2\pi k(n-p)}{M}}$$

where n denotes a time and k denotes frequency.

11. The signal detection apparatus of claim 7, wherein the correlator correlates the DFT signals by the following equation $$S_y^\alpha(n, f) = \sum_{m=-P/2}^{P/2} Y_M(n, k+m)Y_M^*(n, l+m)$$

where m denotes a running variable indicating a period, P is an integer, and $Y_M$ is a DFT signal received from the DFT processor.

12. A signal detection method in a Cognitive Radio (CR)-based wireless communication system, the method comprising:
calculating a power spectral density of a cyclo-stationary and periodical signal and calculating optimum statistics using the power spectral density; and
determining whether a signal to be detected is existent or not according to the optimum statistics;

wherein the calculated power spectral density includes a power spectral density of the signal to be detected and a power spectral density of a current received signal, and the optimum statistics are calculated using the power spectral density of the signal to be detected and the current received signal.

13. The signal detection method of claim 12, wherein the calculating of the optimum statistics comprises:
performing a Discrete Fourier Transform (DFT) on the cyclo-stationary and periodic signal in response to the cyclo-stationary and periodic signal being discrete;
calculating the power spectral density of the signal to be detected by correlating DFT signals; and
calculating the optimum statistics using the power spectral density of the current received signal and the signal to be detected.

14. The signal detection method of claim 13, wherein the performing of the DFT comprises performing the DFT on the cyclo-stationary and periodic signal according to $$Y_M(n, k) = \sum_{p=0}^{M-1} y(n-p) e^{-\frac{j2\pi k(n-p)}{M}}$$

where n denotes a time and k denotes frequency.

15. The signal detection method of claim 12, wherein the calculating of the optimum statistics comprises calculating the optimum statistics by $$y_\alpha(t) = \int_{-\infty}^{\infty} \frac{H^*\left(f + \frac{\alpha}{2}\right) H\left(f - \frac{\alpha}{2}\right) S_x^\alpha(f)^*}{S_n^0\left(f + \frac{\alpha}{2}\right) S_n^0\left(f - \frac{\alpha}{2}\right)} S_{yt}^\alpha(t, f) e^{j2\pi\alpha t} df,$$

where $S_x^\alpha(f)^* S_{yt}^\alpha(t,f)$ is the product between the power spectral density of the signal to be detected, and the power spectral density of the current received signal y(t), $S_n^0(f)$ is the power spectral density of noise n(t) at α=0, and $S_{yt}^\alpha(t,f)$ is the power spectral density of the current received signal y(t).

16. The signal detection method of claim 12, wherein the calculating of the power spectral density comprises calculating the power spectral density of the current received signal by $$S_y^\alpha(n, f) = \sum_{m=-P/2}^{P/2} Y_M(n, k+m) Y_M^*(n, l+m)$$

where m denotes a running variable indicating a period, P is an integer, and $Y_M$ is a Discrete Fourier Transform (DFT) signal received from the DFT processor.

17. A signal detection method in a Cognitive Radio (CR)-based wireless communication system, comprising:
performing a Discrete Fourier Transform (DFT) on an input signal in response to the input signal being discrete and outputting DFT signals;
calculating a power spectral density of the input signal by correlating the DFT signals; and
calculating optimum statistics using the power spectral density;
wherein the calculated power spectral density includes a power spectral density of a signal to be detected and a power spectral density of a current received signal, and the optimum statistics are calculated using the power spectral density of the signal to be detected and the current received signal.

18. The signal detection method of claim 17, further comprising: determining whether the input signal is detected or not based on the optimum statistics.

19. The signal detection method of claim 17, wherein the calculating of the optimum statistics comprises calculating of the optimum statistics using the power spectral density by $$y_\alpha(t) = \int_{-\infty}^{\infty} \frac{H^*\left(f + \frac{\alpha}{2}\right) H\left(f - \frac{\alpha}{2}\right) S_x^\alpha(f)^*}{S_n^0\left(f + \frac{\alpha}{2}\right) S_n^0\left(f - \frac{\alpha}{2}\right)} S_{yt}^\alpha(t, f) e^{j2\pi\alpha t} df$$

where $S_x^\alpha(f)^* S_{yt}^\alpha(t,f)$ is the product between the power spectral density of the signal to be detected, and the power spectral density of the current received signal y(t), $S_n^0(f)$ is the power spectral density of noise n(t) at α=0, and $S_{yt}^\alpha(t,f)$ is the power spectral density of the current received signal y(t).

20. The signal detection method of claim 17, wherein the performing of the DFT comprises performing the DFT on the input signal according to $$Y_M(n, k) = \sum_{p=0}^{M-1} y(n-p) e^{-\frac{j2\pi k(n-p)}{M}}$$

where n denotes a time and k denotes frequency.

21. The signal detection method of claim 17, wherein the correlating of the DFT signals comprises correlating the DFT signals by the following equation $$S_y^\alpha(n, f) = \sum_{m=-P/2}^{P/2} Y_M(n, k+m) Y_M^*(n, l+m)$$

where m denotes a running variable indicating a period, P is an integer, and $Y_M$ is a DFT signal received from the DFT processor.

* * * * *